(12) United States Patent
Fladhammer

(10) Patent No.: US 6,692,176 B1
(45) Date of Patent: Feb. 17, 2004

(54) BALL SOCKET WITH LOCKING FEATURE

(75) Inventor: Scott T. Fladhammer, Kenosha, WI (US)

(73) Assignee: Asyst Technologies LLC, Kenosha, WI (US)

(*) Notice: Subject to any disclaimer, the term of this patent is extended or adjusted under 35 U.S.C. 154(b) by 0 days.

(21) Appl. No.: 10/114,841

(22) Filed: Apr. 2, 2002

(51) Int. Cl.[7] ................................................ F16C 11/00
(52) U.S. Cl. .......................... 403/2; 403/122; 403/135; 411/40
(58) Field of Search .............................. 403/143, 2, 122, 403/135, 136, 137, 141, 142, 326, 327, 329; 411/40, 41

(56) References Cited

U.S. PATENT DOCUMENTS

| | | | |
|---|---|---|---|
| 3,513,509 A | * 5/1970 | Gross | .......................... 411/41 |
| 4,111,570 A | 9/1978 | Morel | |
| 4,503,486 A | 3/1985 | Makita | |
| 4,574,334 A | 3/1986 | Igura | |
| 4,579,473 A | * 4/1986 | Brugger | ...................... 403/163 |
| 4,607,976 A | 8/1986 | Peek et al. | |
| 4,621,307 A | 11/1986 | Weber | |
| 4,689,725 A | 8/1987 | Saijo et al. | |
| 4,722,029 A | 1/1988 | Ahle et al. | |
| 4,849,860 A | 7/1989 | Schauwecker | |
| 4,884,174 A | 11/1989 | Dorleans | |
| 4,894,754 A | 1/1990 | Levilain | |
| 4,947,306 A | 8/1990 | O'Shaughnessey | |
| 4,967,318 A | 10/1990 | Ewert et al. | |
| 4,974,123 A | 11/1990 | Luallin et al. | |
| 5,003,436 A | 3/1991 | Yamada et al. | |
| 5,011,322 A | 4/1991 | Schauwecker | |
| 5,045,987 A | 9/1991 | Hebert | |
| 5,047,904 A | 9/1991 | Vraux | |
| 5,161,876 A | 11/1992 | Smith | |
| 5,186,531 A | 2/1993 | Ryder et al. | |
| 5,258,894 A | 11/1993 | Bivens | |
| 5,444,603 A | 8/1995 | Otsuka et al. | |
| 5,508,896 A | 4/1996 | Suehiro et al. | |
| 5,526,238 A | 6/1996 | Van Oel et al. | |
| 5,546,283 A | 8/1996 | Ohtsuka et al. | |
| 5,707,133 A | 1/1998 | Burton | |
| 5,741,059 A | 4/1998 | Kusagaya | |
| 5,743,618 A | 4/1998 | Fujino et al. | |
| 5,746,559 A | 5/1998 | Shirai | |
| 5,833,347 A | 11/1998 | Nakamura et al. | |
| 5,908,239 A | 6/1999 | Sugimoto | |
| 6,017,136 A | 1/2000 | Burton | |
| 6,050,712 A | 4/2000 | Burton | |
| 6,113,301 A | 9/2000 | Burton | |
| 6,231,223 B1 | 5/2001 | Zucar et al. | |
| 6,234,655 B1 | 5/2001 | Suehiro et al. | |
| 6,244,735 B1 | 6/2001 | Burton | |
| 6,247,868 B1 | 6/2001 | Burton | |
| 6,257,747 B1 | 7/2001 | Burton | |
| 6,276,882 B1 | 8/2001 | Young | |
| 6,315,438 B1 | 11/2001 | Shirai et al. | |
| 6,322,305 B1 | * 11/2001 | Bantle | ......................... 411/41 |

* cited by examiner

Primary Examiner—John R. Cottingham
(74) Attorney, Agent, or Firm—Brian G. Gilpin; Godfrey & Kahn, S.C.

(57) ABSTRACT

A ball socket for connection with a wall or plate type structure resists accidental pull-out therefrom. The ball socket includes a socket cup for retaining a ball stud. Snap locks extend from the ball socket to provide a mechanical connection with the structure. A sleeve located initially in the socket cup is driven between the snap locks as the ball stud is placed in the socket cup. This prevents the snap locks from moving in a manner that allows the ball socket to be accidentally pulled from the structure. The structure may be a wall in a headlamp assembly.

20 Claims, 4 Drawing Sheets

BALL SOCKET WITH LOCKING FEATURE

BACKGROUND OF THE INVENTION

This invention relates generally to pivot joints, and in particular to a pivot joint useful for connecting a headlamp adjuster to a reflector inside a headlamp assembly.

Pivotable spherical joints, commonly referred to as ball joints, include a ball stud engaged in a socket. Such joints have a wide variety of applications where a pivotable connection between two parts is desirable. For example, they may be used in many types of linear actuators and have been found to be particularly useful in automotive lamp assemblies. As disclosed in FIGS. 17 and 23 of U.S. Pat. No. 6,247,868, the disclosure of which is hereby incorporated by reference, automotive lamp assemblies used as headlights typically comprise several basic parts: a support frame, a reflector, a lens, a bulb, and one or more adjusters. The support frame houses the reflector and the bulb on a pivotable mounting to allow the aim of the light to be adjusted using the adjuster. The lens seals the front of the assembly to protect it from the elements assailing the front end of the vehicle and provides an aerodynamic shape and attractive appearance. The reflector mounts inside the housing on a fixed ball joint and is adjustable horizontally and vertically using adjusters that interface with the reflector through moving ball joints. The moving ball joints are moveable by actuating the adjusters connected to the moving ball joints by a ball stud having a head and a shaft. In some automotive lamp assemblies, two fixed ball joints and one moving ball joint may be used.

As is known in the art, ball studs interface with plastic sockets, such as the one shown in FIG. 7. This is just one example of a prior art automobile headlight 10 having a reflective mirror tiltably mounted in a lamp space which is defined by a lamp body 12 and a lens 14. Lamp body 12 is formed of a synthetic resin material and defines a recess 16 which opens in the forward direction. The lens 14 is mounted on the lamp body 12 to cover the recess 16. A reflective mirror 18 is tiltably disposed in a lamp space 20 which is defined between the lamp body 12 and the lens 14.

The reflective mirror 18 is supported on the lamp body 12 at three points. At one point 22 in particular, the reflective mirror 18 is supported on the lamp body 12 through a ball socket assembly 24. Socket assembly 24 comprises a ball stud 26 mounted on the lamp body 12, and a ball socket 28 supported on the reflective mirror 18 by a pair of flexible arms or locking tabs 19. The spherical portion 30 of the ball stud 26 engages with the spherical recess 32 of the ball socket 28, thereby the mirror is pivotably connected to the lamp body 12.

While functionally quite effective, there is at least one shortcoming to using ball studs with locking tabs. This shortcoming is that the locking tabs 19 can be pulled out of reflector wall 21 under certain conditions of operation, leaving the adjuster non-operational. This unexpected pull-out generally occurs because the locking tabs 19 are necessarily flexible. Tabs 19 must be flexible enough to allow the tabs 19 to be inserted into an aperture in the reflector wall 21, while at the same time resist pull-out. Though pull-out of the ball stud is resisted to some degree of success, if enough force is applied, tabs 19 slip inward toward the center of the aperture and the socket 28 "pops out" of the wall 21. Reducing the flexibility of tabs 19 has not been found an effective option because it becomes too difficult to insert the socket 28 into the wall 21, or the elasticity of the tabs 19 is lessened to the degree that they break off during insertion of the socket 28.

Accordingly, the need exists for an improved ball socket that can be securely retained in a wall or other structure, can be adapted for use in connection with various ball stud designs, is cost effective, and resists accidental pull-out. The present invention relates to an improved ball joint which is capable of being used in automotive lamp assemblies and solves the problems raised or not solved by existing ball joints. Of course, the present invention may be used in a multitude of non-automotive lamp situations where similar performance capabilities are required.

SUMMARY OF THE INVENTION

The present invention provides a ball socket that is cost-effective, easily installed in the lamp where it is securely retained, and is adaptable for use in connection with various ball studs.

The ball socket of the present invention has at least a pair of locking tabs or snap locks extending therefrom. These locking tabs have an outwardly extending lip on the end opposite to where a ball stud is attached to the socket, which creates a necked portion on the locking tabs. The locking tabs elastically deflect inward when inserted into an aperture in a wall or the like, and return to their original position once the locking tab lips are completely through the aperture.

The ball socket further includes a sleeve that is located in the socket cup. When a ball stud is inserted into the socket cup, the sleeve is driven to a location between the locking tabs. This prevents the locking tabs from deflecting inward, and secures the ball socket to the wall or a mounting plate. The sleeve may be connected to the ball socket with by a shear tab that is sheared off by dislocating the sleeve. Alternatively, the sleeve may be separate from the ball socket, and temporarily seated by shear tabs that are also sheared off by dislocating the sleeve.

The ball socket can be designed to accept different types of ball studs, either conventional or disengageable, such as the one disclosed in U.S. Pat. No. 6,113,301. The ability to use the socket with a wide variety of ball studs provides a significant benefit to headlamp assemblers because it allows the use of one style of socket with a number of types of ball stud.

While one possible application of the present invention is in headlamp assemblies, many other applications are possible and references to use in a headlamp assembly should not be deemed to limit the uses of the present invention. The terms "ball stud," or "head" as used herein should not be interpreted as being limited to spherical or semispherical shapes, rather, the heads of ball studs in accordance with the present invention may have a wide variety of shapes and may include protrusions having semispherical or otherwise pivotably-shaped tips. These and other objects and advantages of the present invention will become apparent from the detailed description, claims, and accompanying drawings.

DETAILED DESCRIPTION OF THE PREFERRED EMBODIMENTS

Two embodiments of improved ball socket 100 in accordance with the present invention are shown in FIGS. 1 through 6. Socket 100 can be effectively used with conventional ball studs or disengageable ball studs such as the ones disclosed in U.S. Pat. No. 6,113,301. Referring to FIGS. 1 through 4, socket 100 may be a one-piece design, and in FIGS. 5 and 6, socket 100 may be a two piece design.

Figure 1:
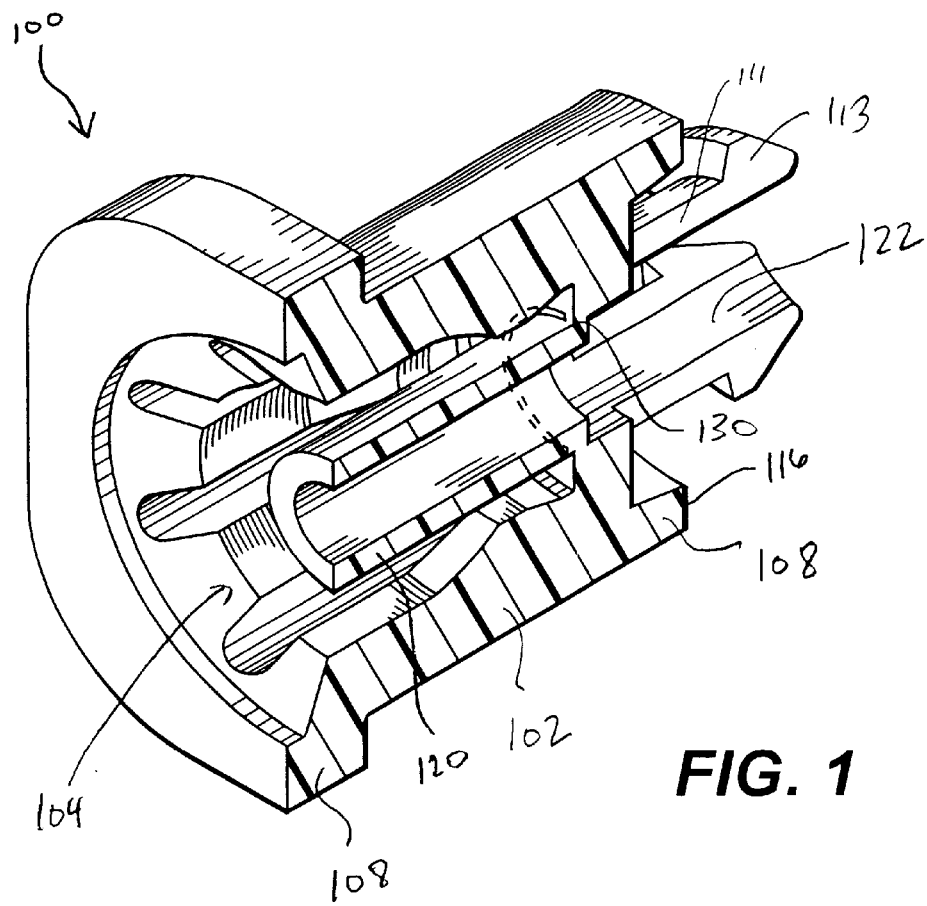
FIG. 1 is a cross-sectional perspective view of one embodiment of a ball socket in accordance with the present invention, taken at lines 1—1 in FIG. 2.
Figure 2:
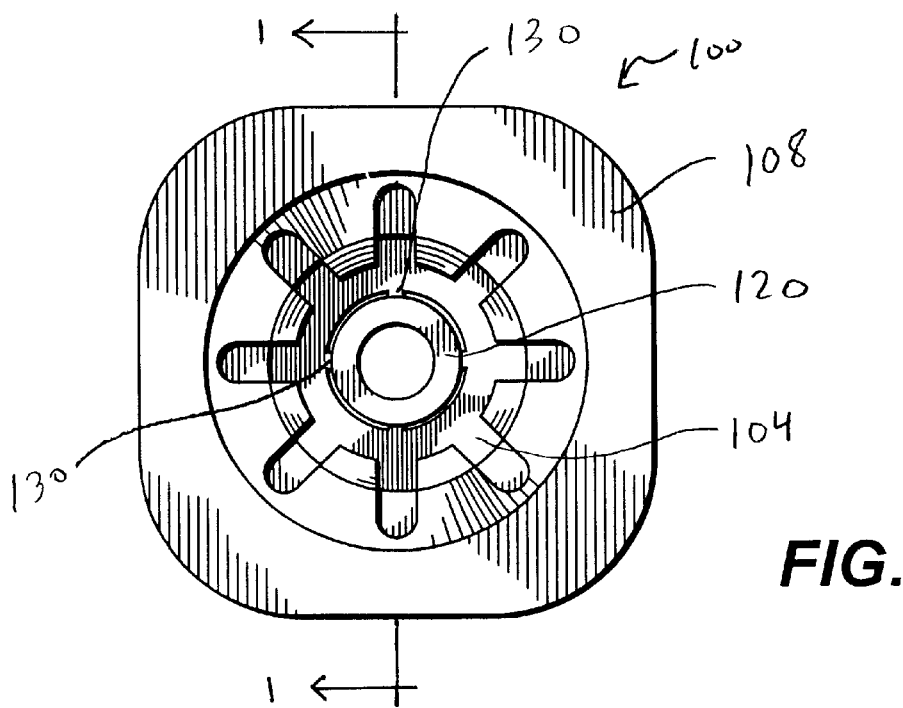
FIG. 2 is a top elevational view of the ball socket shown in FIG. 1.
Figure 3:
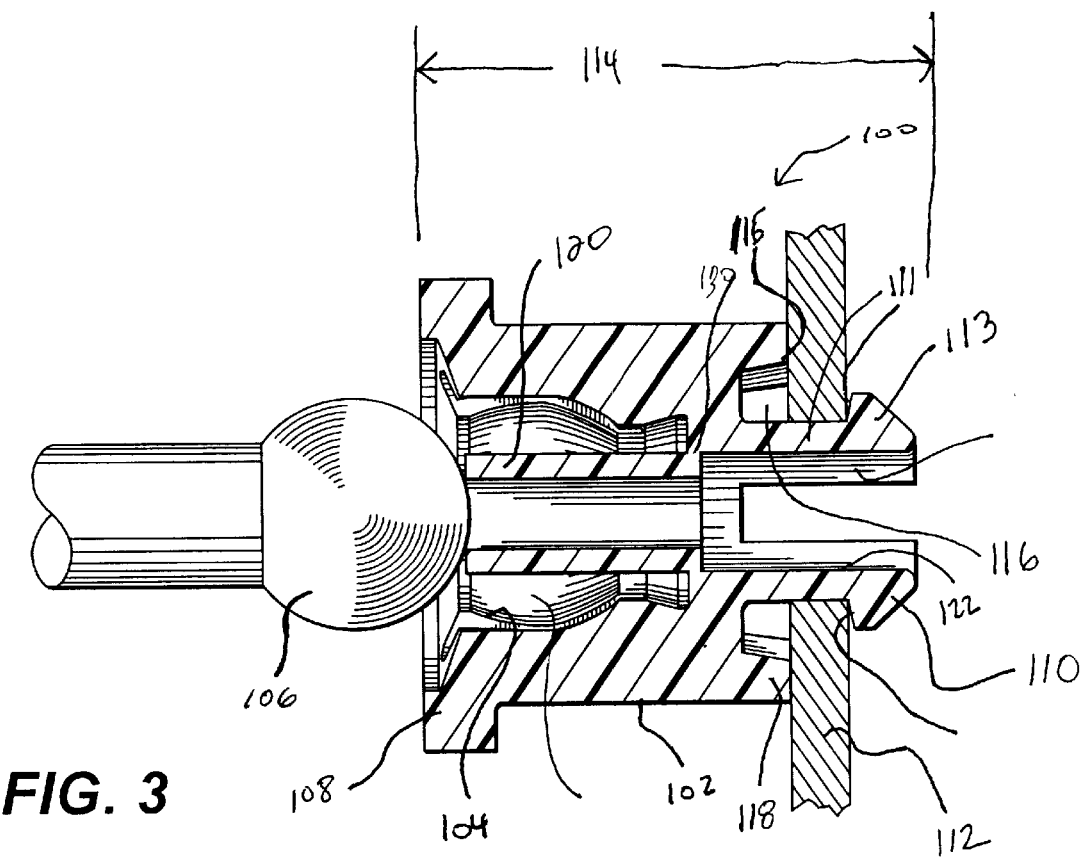
FIG. 3 is a cross-sectional side view of the ball socket of FIG. 1, further showing the ball socket attached to a mounting plate, and a ball stud presented for insertion into the ball socket.
Figure 4:
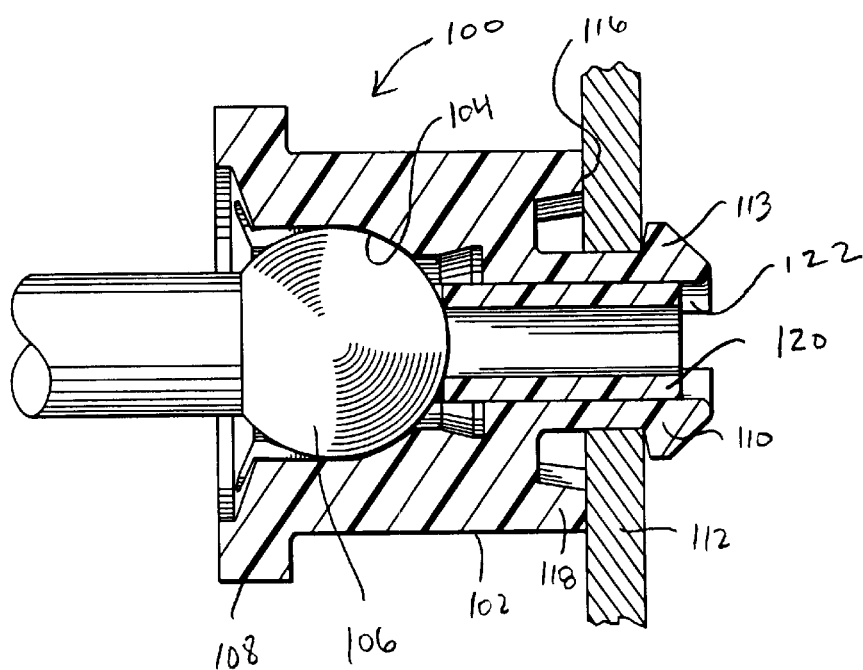
FIG. 4 is the ball socket of FIG. 3, showing the ball stud completely inserted into the socket.

Referring now to FIG. 1, socket 100 has a body 102 with a socket cup 104 therein for receiving a ball stud head 106. Socket cup 104 may have various configurations and is not limited to the particular socket cup shown. Likewise, the ball stud head 106 is not limited to the spherical head shown, but may include semispherical shaped heads or heads that include protrusions. A face plate 108 may border the entrance to socket cup 104 as shown. The purpose of face plate 108 is to provide structural stability to the particular socket cup 100 shown in FIGS. 1–6. However, the face plate 108 may be omitted on a particular design.

Extending from body 102 at the end opposite face plate 108, are locking tabs 110. There are at least two tabs 110, and most preferably fours tabs 10 extending from body 102. Locking tabs 110 are constructed from an arm 111 having a outwardly extending lip 113. Tabs 110 are necessarily flexible to the degree that they can be forced into an aperture in wall or mounting plate 112 of a reflector without causing plastic deformation in a mechanical sense. Thus, locking tabs 110 extend beyond the base 115 of body 102, and the distance between base 115 and lip 113 is the thickness of plate 112. So that the overall length 114 of socket 100 is as short as possible, it is preferable to have tabs 110 extend from a recessed portion 116 of body 102. For a socket 100 of a given length, this recess allows the tabs to be more flexible than they would be without recessed portion 116. The recessed portion is defined by a set of feet 118.

The improvement that is the present invention is a sleeve member 120 that temporarily resides in the socket cup until the head 106 is inserted into the socket cup 104. As seen best in FIGS. 1 and 3, sleeve member 120 is attached to socket 100 by a plurality of shear tabs 130. Preferably, there are about four shear tabs. Socket 100 is preferably manufactured using conventional injection molding technology so that shear tabs 130, sleeve 120 and body 102 are all integrally connected. The act of inserting head 106 into socket cup 104 creates enough shear force to cause a shear failure in shear tabs 130. As a result, sleeve 120 becomes separated from body 102, and is free for displacement into the space between locking tabs 110, the space being defined by the inner surfaces 122 of locking tabs 110. When the head 106 occupies socket cup 104, even partially, sleeve member 120 prevents locking tabs 110 from being deflected toward the longitudinal axis of body 102. The inability for locking tabs 110 to move inwardly greatly prevents the accidental pull-out of socket 100 from mounting plate 112.

Figure 5:
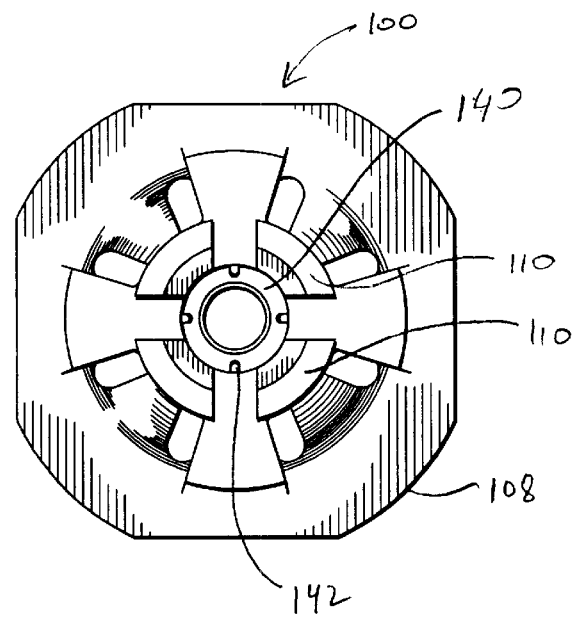
FIGS. 5 is a top elevational view of an alternative embodiment of a ball socket in accordance with the present invention.
Figure 6:
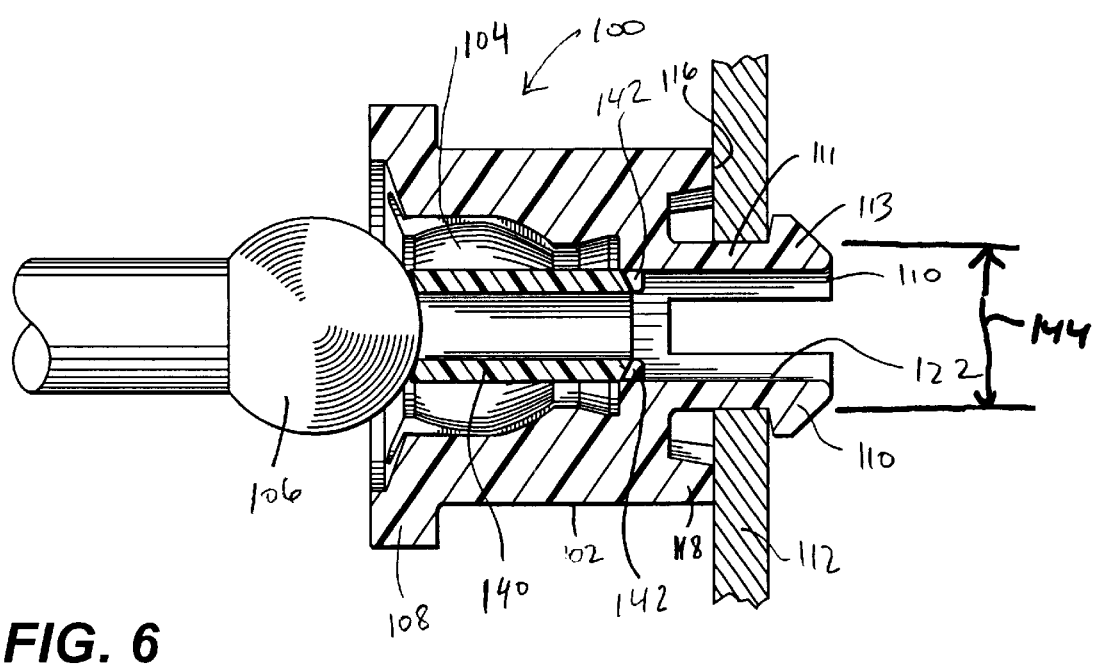
FIG. 6 is a cross-sectional side view of the ball socket of FIG. 5, further showing the ball socket attached to a mounting plate, and a ball stud presented for insertion into the ball socket.
Figure 7:
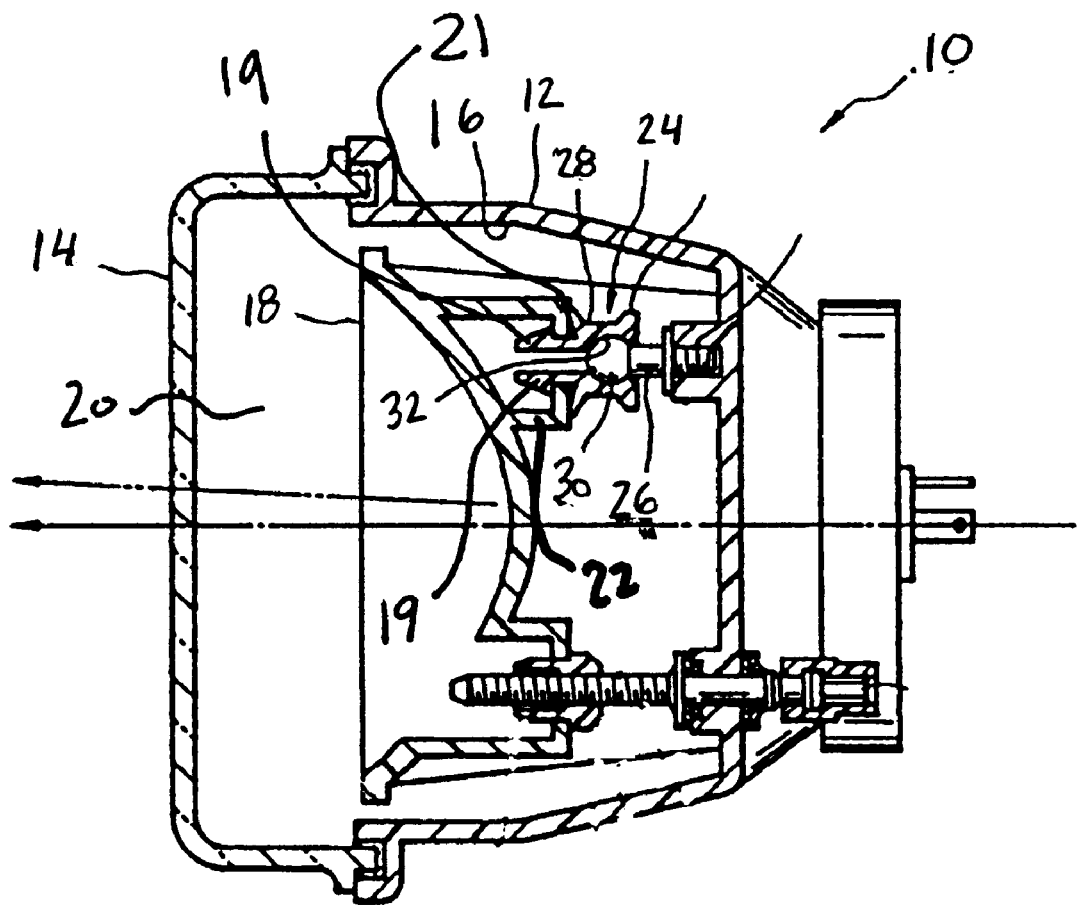
FIG. 7 is a prior art ball socket having flexible tabs that engage a reflector wall in a lamp assembly.

Referring now to FIGS. 5 and 6, in a second embodiment of the present invention, sleeve member 140 is separate from body 102. Specifically, body 102 has shear tabs 142 projecting into the space between locking tabs 110. Preferably, there are about four shear tabs 130. To facilitate the movement of sleeve member 140 past the shear tabs 142, the end of sleeve member 104 contacting shear tabs 142 is beveled giving the sleeve member a more pointed appearance at that end. Likewise, shear tabs 142 are inwardly beveled to substantially match the beveled sleeve member 140. Sleeve member 140 is inserted into socket cup 104 immediately prior to the insertion of ball stud head 106. The beveled surfaces on the sleeve and the shear tabs 142 help to ensure that the sleeve member 140 is seated properly before being forced between locking tabs 110.

Regardless of the socket embodiment used, is preferable that the diameter of the aperture in mounting plate 112 is slightly undersized in comparison to the outer diameter 144 of the locking tabs 110. This creates an interference fit between the socket 100 and mounting plate 112 when sleeve 120, 140 is driven into the space between locking tabs 1 10.

In operation, the method of attaching a ball socket to a headlamp reflector generally includes the steps of first inserting the locking tabs 110 extending from socket 100 into the mounting plate 112 aperture. Second, the ball stud head 106 is inserted into the socket cup 104. This slidably displaces the sleeve member 120 or 140 from the ball socket to a location between the locking tabs. The displacement occurs after plastically deforming or shearing the shear tabs 130 or 142 with the sleeve member.

The socket of the present invention has many other applications aside from use in a lamp assembly. Thus, although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims.

I claim:

1. A ball socket for use with a ball stud, the socket comprising:

a socket body with socket cup therein adapted to receive a ball stud, the socket cup having an interior, a sleeve positioned within the interior of the socket cup;

locking tabs extending from the ball socket at an end of the socket body opposite the socket cup; and wherein the sleeve is driveable from the socket cup to a location between the locking tabs as a ball stud is placed into the socket cup.

2. The ball socket of claim 1 wherein each of the locking tabs comprise an arm with a lip at an end of the arm.

3. The ball socket of claim 2 wherein each of the locking tabs has an interior surface and an outer diameter of the sleeve is substantially the same as a diametric distance between the interior surfaces of the locking tabs.

4. The ball socket of claim 3 wherein the sleeve is connected to the socket body by at least one shear tab.

5. The ball socket of claim 3 wherein the sleeve is separate from the socket body and is seated into the socket cup by at least a pair of shear tabs.

6. The ball socket of claim 1 wherein the socket is formed from injection molded plastic.

7. The ball socket of claim 1 wherein the locking tabs extend from a recess defined by a plurality of legs depending from the socket body.

8. A headlamp assembly comprising:

a reflector with a mounting plate having an aperture therethrough;

a ball socket secured to the reflector through the aperture, the ball socket including:

a socket body with socket cup therein adapted to receive a ball stud, the socket cup having an interior;

a sleeve positioned within the interior of the socket cup; and locking tabs extending from the ball socket at an end of the socket body opposite the socket cup; and wherein the sleeve driveable to a location between the locking tabs so as to secure the socket body to the mounting plate.

9. The ball socket of claim 8 wherein each of the locking tabs comprise an arm with a lip at an end of the arm.

10. The ball socket of claim 9 wherein each of the locking tabs has an interior surface and an outer diameter of the sleeve is substantially the same as a diametric distance between the interior surfaces of the locking tabs.

11. The ball socket of claim 10 wherein the sleeve is connected to the socket body by at least one shear tab.

12. The ball socket of claim 10 wherein the sleeve is separate from the socket body and is seated into the socket cup by at least a pair of shear tabs.

13. The ball socket of claim 8 wherein the socket is formed from injection molded plastic.

14. The ball socket of claim 8 wherein the locking tabs extend from a recess defined by a plurality of legs depending from the socket body.

15. A ball socket comprising:

a socket body with a socket cup therein adapted to receive a ball stud, the socket cup having an interior;

a sleeve positioned within the interior of the socket cup, the sleeve having an exterior surface;

a plurality of locking tabs extending from the socket body at an end of the socket body opposite the socket cup, each of the plurality of locking tabs having an interior surface that with the other locking tabs define a space that substantially conforms to the exterior surface of the sleeve;

at least one shear tab located within the socket body between the sleeve and the space; and wherein moving a ball stud into the socket cup causes shearing failure of the at least one shear tab thereby allowing the sleeve to be slidably displaced from the location within the interior of the socket cup to the space defined by the plurality of locking tabs.

16. The ball socket of claim 15 wherein the sleeve is connected to the socket body by the at least one shear tab.

17. The ball socket of claim 15 wherein the sleeve is separate from the socket body and is positioned in the socket cup by at least a pair of shear tabs.

18. The ball socket of claim 15 wherein the each of the plurality of locking tabs comprise an arm with a lip at an end of the arm.

19. A method of attaching a ball socket to a reflector comprising the steps of:

inserting locking tabs extending from the ball socket into an aperture located on a mounting plate of the reflector;

inserting a ball stud into a socket cup in the ball socket; and slidably displacing a sleeve from the socket cup to a position between the locking tabs.

20. The method of claim 19 wherein the step of slidably displacing the sleeve causes shear failure of a shear tab located between the sleeve and the locking tabs.

* * * * *